United States Patent
Jiang

(10) Patent No.: US 11,966,717 B2
(45) Date of Patent: Apr. 23, 2024

(54) CAN FILTER COMBINING METHOD, DEVICE, AND CAN CONTROLLER

(71) Applicant: AUTEL INTELLIGENT TECHNOLOGY CORP., LTD., Guangdong (CN)

(72) Inventor: Chu Jiang, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 77 days.

(21) Appl. No.: 17/652,001

(22) Filed: Feb. 22, 2022

(65) Prior Publication Data

US 2022/0179622 A1 Jun. 9, 2022

Related U.S. Application Data

(63) Continuation of application No. PCT/CN2020/118141, filed on Sep. 27, 2020.

(30) Foreign Application Priority Data

Sep. 30, 2019 (CN) .......................... 201910942732.5

(51) Int. Cl.
  *G06F 7/76* (2006.01)
  *G06F 7/544* (2006.01)
  *H04L 12/40* (2006.01)

(52) U.S. Cl.
  CPC ............ *G06F 7/764* (2013.01); *G06F 7/5443* (2013.01); *H04L 12/40* (2013.01); *H04L 2012/40215* (2013.01)

(58) Field of Classification Search
  None
  See application file for complete search history.

(56) References Cited

U.S. PATENT DOCUMENTS 6,912,594 B2 * 6/2005 Bartling .................. H04L 49/90
  710/316
7,430,261 B2 * 9/2008 Forest ................... H03M 13/43
  375/364

(Continued)

FOREIGN PATENT DOCUMENTS

AU 2002324924 A1 4/2003
CN 101931581 A 12/2010

(Continued)

OTHER PUBLICATIONS

Machine Translation of Chinese Patent Application CN-111130847-A, filed Nov. 28, 2019. (Year: 2019).*

(Continued)

*Primary Examiner* — Steven G Snyder
(74) *Attorney, Agent, or Firm* — Frank Gao, Esq.

(57) ABSTRACT

A (controller area network) CAN filter combining method and a CNA controller are provided. The CAN filter includes a special filter and one or more common filters. The method includes: initializing a mask code and at least two filter codes of the special filter, acquiring a first total number of the filter codes in the special filter and a second total number of the common filters, acquiring mask codes and filter codes of the common filters, and adjusting the mask code and the filter codes of the special filter on the basis of the first total number, the second total number, and the mask codes and the filtering codes of all of the common filters. The method reduces the load of a processor, and prevents the CAN controller from processing a large amount of irrelevant data, thereby accelerating communications.

15 Claims, 3 Drawing Sheets

(56) References Cited

U.S. PATENT DOCUMENTS

| | | | | |
|---|---|---|---|---|
| 7,586,953 | B2* | 9/2009 | Forest | H04L 12/417 370/503 |
| 7,933,998 | B2* | 4/2011 | Anderson | H04L 12/40169 709/227 |
| 7,979,594 | B2* | 7/2011 | Bartling | H04L 49/90 710/5 |
| 8,650,356 | B2* | 2/2014 | Wilson | H04L 49/90 711/104 |
| 9,954,892 | B2* | 4/2018 | Elend | H04L 12/40045 |
| 10,361,934 | B2* | 7/2019 | Elend | H04L 63/1416 |
| 10,565,148 | B2* | 2/2020 | Giusto | H04L 12/40013 |
| 11,463,198 | B2* | 10/2022 | Elend | H04L 63/1466 |
| 11,677,779 | B2* | 6/2023 | Elend | H04B 1/38 726/23 |
| 2003/0135622 | A1* | 7/2003 | Anderson | H04L 69/22 709/227 |
| 2004/0081079 | A1* | 4/2004 | Forest | H04L 12/4035 370/216 |
| 2004/0081193 | A1* | 4/2004 | Forest | H03M 13/43 370/458 |
| 2004/0090962 | A1* | 5/2004 | Forest | H04L 12/6418 370/442 |
| 2004/0151047 | A1 | 8/2004 | Bartling et al. | |
| 2005/0141565 | A1* | 6/2005 | Forest | H04L 12/44 370/503 |
| 2008/0274689 | A1 | 11/2008 | Kuban | |
| 2010/0017490 | A1* | 1/2010 | Bartling | H04L 49/901 709/206 |
| 2010/0306457 | A1* | 12/2010 | Wilson | H04L 49/901 711/E12.007 |
| 2011/0125855 | A1 | 5/2011 | Hartwich et al. | |
| 2017/0093659 | A1* | 3/2017 | Elend | H04L 63/1416 |
| 2017/0235698 | A1* | 8/2017 | van der Maas | G06F 11/0784 710/106 |
| 2018/0227145 | A1* | 8/2018 | Brochi | H04L 63/0428 |
| 2019/0347232 | A1* | 11/2019 | Giusto | G06F 13/4027 |
| 2021/0044382 | A1* | 2/2021 | Elend | H04L 63/1466 |

FOREIGN PATENT DOCUMENTS

| | | | | |
|---|---|---|---|---|
| CN | 104168130 | A | 11/2014 | |
| CN | 106657128 | A | 5/2017 | |
| CN | 106878128 | A | 6/2017 | |
| CN | 107948176 | A | 4/2018 | |
| CN | 108366008 | A | 8/2018 | |
| CN | 110808891 | A | 2/2020 | |
| EP | 1085720 | A2 | 3/2001 | |
| EP | 3148154 | B1 * | 3/2018 | H04L 12/40045 |
| EP | 3493559 | A1 | 6/2019 | |
| EP | 3772839 | B1 * | 1/2023 | G06F 11/1004 |
| WO | 03025940 | A2 | 3/2003 | |

OTHER PUBLICATIONS

'PSoC Creator Component Data Sheet—Controller Area Network (CAN) 1.20' by Cypress Semiconductor Corporation, Revised Dec. 4, 2010. (Year: 2010).*

'CAN Specification version 2.0' pp. A3, A4, A6, B56, 1991. (Year: 1991).*

The extended European search report dated Oct. 10, 2022; Appln. No. 20872418.7.

International search report of PCT/CN2020/118141 dated Dec. 30, 2020.

Wu Chengjia; "Design on MSCAN Communication Acceptance Filter", Bus & Coach Technology and Research, No. 4; 2015; 4 pages.

* cited by examiner

CAN FILTER COMBINING METHOD, DEVICE, AND CAN CONTROLLER

CROSS REFERENCE OF RELATED APPLICATIONS

This application is continuation application of International Application No. PCT/CN2020/118141, filed on Sep. 27, 2020, which claims the priority to the Chinese patent application No. 201910942732.5, filed on Sep. 30, 2019, which are incorporated herein by reference in their entirety.

TECHNICAL FIELD

The present application relates to the technical field of electronic information, and in particular to a controller area network (CAN) filter combining method, device, and CAN controller.

BACKGROUND

In a scenario of the communication based on a controller area network (CAN) bus, filtering the data of the bus is generally involved. The function of data filtering is usually achieved by setting a mask code and filter code of a filter in a CAN controller to match the identifier of the data.

The above related art has at least problems as follows: in filters in the existing CAN controllers, the number of filter codes that pass through an assignable value is fixed, and when there are many types of irrelevant data that need to be filtered, they can usually only be filtered by means of software filtering, which increases the load of a processor and slows down the communication speed.

SUMMARY

To address the above-discussed deficiencies of the prior art, it is an object of embodiments of the present application to provide a filter combining method, a device, and a CAN controller that communicate fast.

The object of the embodiments of the present application is achieved by the following technical solution.

In order to solve the above technical problem, in a first aspect, an embodiment of the present application provides a CAN filter combining method, wherein the CAN filter include a special filter and at least one common filter, the special filter comprising a mask code and at least two filter codes, and the common filter including a mask code and a filter code. The CAN filter combining method includes:
  initializing the mask code and the filter codes of the special filter;
  acquiring a first total number of the filter codes in the special filter and a second total number of common filters;
  acquiring mask codes and filter codes of all of the common filters; and
  adjusting the mask code and the filter codes of the special filter on the basis of the first total number, the second total number, and the mask codes and the filter codes of all of the common filters, to enable data capable of passing through each of the common filters to pass through the special filter.

In some embodiments, the step of adjusting the mask code and the filter codes of the special filter on the basis of the first total number, the second total number, and the mask codes and the filter codes of all of the common filters, specifically comprises:
  determining whether the first total number is less than or equal to the second total number, performing a bitwise AND calculation successively on the mask codes of all the common filters to obtain a first numerical value if the first total number is less than or equal to the second total number;
  assigning a value of the first numerical value to the mask code of the special filter; and
  assigning the value of the filter code of the common filter to a filter code of the special filter.

In some embodiments, the method further comprises: acquiring the second total number of the common filters if the first total number is greater than the second total number;
  assigning the acquired value of the filter code of the common filter to a filter code of the special filter;
  performing the bitwise AND calculation successively on all acquired mask codes of the common filters to obtain a second numerical value; and
  adjusting the mask code of the special filter based on the second numerical value and the filter codes of remaining common filters.

In some embodiments, the step of adjusting the mask code of the special filter based on the second numerical value and the filter codes of remaining common filters specifically comprises:
  successively calculating a code distance between the filter codes of each of the remaining common filters and all filter codes of the special filter;
  acquiring the filter code in the special filter corresponding to each of the remaining common filters when code distance thereof is minimum;
  acquiring data bits that are different between the filter code of each of the remaining common filters and its corresponding filter code in the special filter; and
  setting the value of the mask code of the special filter on the data bit to zero.

In some embodiments, the step of initializing the mask code and filter codes of the special filter specifically comprises:
  setting the value of the mask code and filter code of the special filter to one.

In order to solve the above technical problem, in a second aspect, an embodiment of the present application provides a CAN filter combining device, wherein the CAN filter includes a special filter and at least one common filter, the special filter including a mask code and at least two filter codes, and the common filter comprising a mask code and a filter code. The CAN filter combining device includes:
  an initialization module configured to initialize the mask code and filter codes of the special filter;
  a first acquisition module configured to acquire a first total number of filter codes in the special filter and a second total number of the common filter;
  a second acquisition module configured for acquiring mask codes and filter codes of all the common filters; and
  an adjustment module configured to adjust the mask code and the filter codes of the special filter on the basis of the first total number, the second total number, and the mask codes and the filter codes of all of the common filters, such that data capable of passing through each of the common filters is enabled to pass through the special filter.

In some embodiments, the adjustment module is further configured to determine whether the first total number is less than or equal to the second total number; perform a bitwise AND calculation successively on mask codes of all the common filters to obtain a first numerical value if the first total number is less than or equal to the second total number; the first numerical value is assigned to the mask code of the special filter; and the value of the filter code of the common filter is assigned to a filter code of the special filter.

In some embodiments, the adjustment module is further configured to acquire a second total number of the common filters if the first total number is greater than the second total number; the value of the acquired filter code of the common filter is assigned to a filter code of the special filter; bitwise AND calculation is successively performed on all acquired mask codes of the common filter to obtain a second numerical value; and the mask code of the special filter is adjusted based on the second numerical value and the filter codes of remaining common filters.

In some embodiments, the adjustment module is further configured for successively calculating a code distance between the filter codes of each of the remaining common falters and all the filter codes of the special filter; acquire the filter code in the special filter corresponding to each of the remaining common filters when the code distance thereof is the minimum; acquire data bits which are different between the filter code of each of the remaining common filters and the filter code corresponding thereto in the special filter; and set the value of the mask code of the special filter on the data bit to zero.

In some embodiments, the initialization module is further configured to set the value of the mask code and filter code of the special filter to one.

In order to solve the above technical problem, according to a third aspect, the embodiment of the present application provides a CAN controller, including:
  at least one processor; and
  a memory communicatively connected to at least one processor;
    wherein the memory stores instructions executable by at least one processor, the instructions being executed by at least one processor to enable at least one processor to execute the method as described in the first aspect.

To solve the above technical problem, according to a fourth aspect, the embodiment of the present application also provides a computer-readable storage medium. The computer-readable storage medium stores computer-executable instructions for causing a computer to execute the method as described in the first aspect.

To solve the above technical problem, in a fifth aspect, the embodiment of the present application also provides a computer program product including a computer program stored on a computer-readable storage medium, the computer program including g program instructions which, when executed by the computer, cause a computer to execute the method as described in the first aspect.

Compared with the prior art, the beneficial effects of the present application are as follows. Different from the prior art, an embodiment of the present application provides a CAN filter combining method. The CAN filter includes a special filter and at least one common filter. The special filter comprises one mask code and at least two filter codes. The common filters comprise one mask code and one filter code. The method comprises: firstly, initializing the mask code and the filter codes of the special filter, then acquiring a first total number of the filter codes in the special filter and a second total number of the common filters, acquiring mask codes and filter codes of all of the common filters, and adjusting the mask code and the filter codes of the special filter on the basis of the first total number, the second total number, and the mask codes and the filter codes of all of the common filters, such that data capable of passing through each of the common filters is enabled to pass through the special filter. The CAN filter combining method provided by the embodiments of the present application reduces the load of a processor, and prevents a CAN controller from processing a large amount of irrelevant data, thereby accelerating communications.

BRIEF DESCRIPTION OF THE DRAWINGS

One or more embodiments are illustrated by way of examples with the figures in the corresponding drawings. The illustrative examples are not to be construed as limiting the embodiments. Elements/modules and steps in the drawings having the same reference numeral designations represent like elements/modules and steps, and the figures in the accompanying drawings are not to scale unless specifically stated.

DETAILED DESCRIPTION OF EMBODIMENTS

Figure 1:
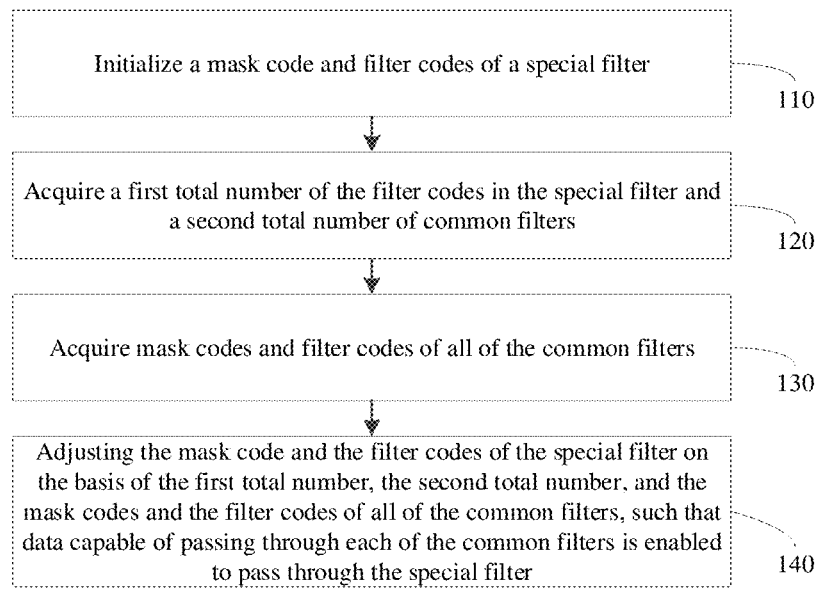
FIG. 1 is a flowchart of a CAN filter combining method provided by an embodiment of the present application.

Hereinafter, the present application will be described in detail with reference to specific embodiments. The following embodiments will aid those skilled in the art in further understanding the present application, but do not limit the present application in any form. It should be noted that several variations and improvements can be made by a person of ordinary skills in the art without departing from the inventive concept. These are all within the scope of the present application.

In order that the object, technical solution, and advantages of the present application may be more clearly understood, the present application will now be described in further detail with reference to the accompanying drawings and embodiments. It should be understood that the particular embodiments described herein are illustrative only and are not restrictive to the present application.

It should be noted that various features of the embodiments of the present application can be combined with each other without conflict within the scope of the present application. In addition, although the division of functional modules is illustrated in a schematic view of a device and logical order is illustrated in a flowchart, in some cases, the steps illustrated or described may be executed in an order other than shown in the flowchart and a division of modules other than illustrated in the device. Furthermore, the words "first", "second" and the like, as used herein do not limit the order of the data and execution, but merely distinguish between identical or similar items that perform substantially the same function and role.

Unless defined otherwise, all technical and scientific terms used in the description have the same meaning as commonly understood by one of ordinary skill in the art to which this application belongs. The terms used in the description of the present application are for the purpose of describing specific implementation modes only and are not intended to be limiting of the present application. As used in the description, the term "and/or" includes any and all combinations of one or more of the associated listed items.

Furthermore, the technical features involved in various implementation modes of the present application described below can be combined as long as they do not conflict with each other.

With respect to multiple communication nodes in the application scenario of communication via a controller area network (CAN) bus, each communication node can receive a large amount of and various data from the CAN bus via the CAN controller and the CAN transceiver. In order to enable the communication node to acquire the data information required by the communication node, it is common to filter out the data not required by the communication node and let the required data pass through by means of setting a filter on the CAN controller to which the communication node is connected. However, the CAN filter provided on the CAN controller at present mainly comprises two types, one is a common filter, and the other is a special filter. The common filter usually comprises one mask code and one filter code, and can filter out one type of data. The special filter usually comprises one mask code and multiple filter codes, and can filter out multiple types of data. However, the number of filter codes in a special filter is usually fixed. When there is a large amount of data required o be filtered, the process of a developer setting a special filter would also be very complicated. Therefore, when the types of data required to be filtered exceed the number of filter codes in a special filter and a common filter in a CAN controller, it is a common practice to set the filter of the CAN controller to all pass, and then perform software filtering on the data.

Since the above-mentioned software filtering method increases the load of a processor and slows down the running speed of a program, an embodiment of the present application provides a CAN filter combining method, which aims to solve the problem that a large amount off useless data needs to be filtered and the number of CAN filters provided in a CAN controller is insufficient. In particular, a developer or user may set a corresponding common filter for the type of data required to be filtered out, which is simpler than setting a special filter directly. Then, all the common filters are combined and assigned to the mask code and filter code of the special filter so that a large amount of useless data can be filtered out by only one special filter.

It should be noted that the combined special filter of the present application may also cause data not belonging to the common filter to pass through, but the special filter can filter out most useless data, and can reduce the amount of filtering processing for subsequent software filtering by the CPU.

Specifically, embodiments of the present application will be further described with reference to the accompanying drawings.

An embodiment of the present application provides a CAN filter combining method. Referring to FIG. 1, a flowchart of a CAN filter combining method provided by an embodiment of the present application is shown. The CAN filter comprises a special filter and at least one common filter, wherein the special filter comprises a mask code and at least two filter codes, and the common filter comprises a mask code and a filter code. The method comprises, but is not limited to, the steps as follows . . . .

Step 110: initializing a mask code and filter codes of a special filter.

In an embodiment of the present application, before the special filter is assigned a value, the mask code and the filter code of the special filter need to be initialized. In particular, the values of the mask code and the filter code of the special filter are set to one, so that the initialized mask code and the filter code can be assigned a value by the mask code and the filter code of any common filter, and the numerical values of the mask code of the assigned special filter and the first filter code are the numerical values of the mask code and the filter code of the common filter for assignment.

The CAN filters are all bit mask filters, and are composed of a mask code and a filter code. The logic of filtering data thereof is to perform a bitwise AND calculation of the mask code respectively with the identifier of the data required to be filtered and the filter code, and the same result after the bitwise AND calculation indicates that the data required to be filtered can pass through the CAN filter.

The mask code is configured for to determine which data bits in the identifier of the data need to be filtered. If a certain data bit of the mask code is zero, it represents that the data bit corresponding to the identifier of the data does not need to participate in the filtering. The filter code is configured to perform the bitwise AND calculation with the mask code. If the calculated result is identical to the calculation result after the bitwise AND calculation of the mask code and the identifier of the data required to be filtered, the data can pass through the filter, and the filter code functions to filter the data.

The bitwise AND calculation specifically refer to that two corresponding data bits (in the present application, binary bit) perform ANDing calculation. If the ANDing results are 1 at the same time, the output result is 1, otherwise, it is 0. For example, if the third data bit of the mask code is 1 and the third data hit of the filter code is 0, then the bitwise AND calculation between the third data bit of the mask code and the third data bit of the filter code are performed to obtain the result of 0.

It should be noted that in the CAN filter calculation, the object to be filtered is an identifier of data, the data bits of the identifier of data are only two kinds (binary system) of 11 bits and 29 bits, and the number of bits of the data bits of the mask code and the filter code in the CAN filter is consistent with the data bits of the identifier of the data.

Step 120: acquiring a first total number of the filter codes in the special filter and a second total number of common filters.

In an embodiment of the present application, it is first necessary to obtain the total number of filter codes in the special filter and the common filter for determining whether a filter code in the common filter can directly assign a value to a filter code in the special filter. Since a common filter only comprises a filter code, acquiring the second total number of the common filters is to acquire the second total number of filter codes in all the common filters.

Step 130: acquiring mask codes and filter codes of all of the common filters.

In an embodiment of the present application, after determining the first total number and the second total number, the mask code and filter code of all common filters are acquired for assigning a value to the mask code and filter code of a specific filter such that the specific filter is capable of filtering identifiers of data that all common filters are capable of filtering.

Step 140: adjusting the mask code and the filter codes of the special filter on the basis of the first total number, the second total number, and the mask codes and the filter codes of all of the common filters, such that data capable of passing through each of the common filters is enabled to pass through the special filter.

In an embodiment of the present application, after determining the first total number, the second total number, and acquiring the mask codes and the filter codes of all of the common filters, value assigning operation is performed for the mask code and all the filter codes of the special filter, so that the data that can be filtered by all the common filters can also be filtered by the special filter. The specific filtering procedure is that: when data passes through the CAN filter of the present application, firstly, the mask code of special filter after being assigned a value performs a bitwise AND calculation respectively with a filter code of the special filter after being assigned a value to obtain multiple first results, the number of the first results being identical to the number of filter codes in the special filter and corresponds thereto in a one-to-one manner; then an identifier of the data performs bitwise AND calculation with the mask code of the special filter after being assigned a value to obtain a second result; finally, the first result is compared with multiple first results in a one-to-one manner, and when there is a first result which is identical to the second result, it represents that the data may then pass through the special filter.

An embodiment of the present application provides a CAN filter combining method. The CAN filter comprises a special filter and at least one common filter. The special filter comprises one mask code and at least two filter codes. The common filters comprise one mask code and one filter code. The method comprises: firstly, initializing the mask code and the filter codes of the special filter, then acquiring a first total number of the filter codes in the special filter and a second total number of the common filters, acquiring mask codes and filter codes of all of the common filters, and adjusting the mask code and the filter codes of the special filter on the basis of the first total number, the second total number, and the mask codes and the filter codes of all of the common filters, such that data capable of passing through each of the common filters is enabled to pass through the special filter. The CAN filter combining method provided by the embodiments of the present application reduces the load of a processor, and prevents a CAN controller from processing a large amount of irrelevant data, thereby accelerating communications.

Figure 2:
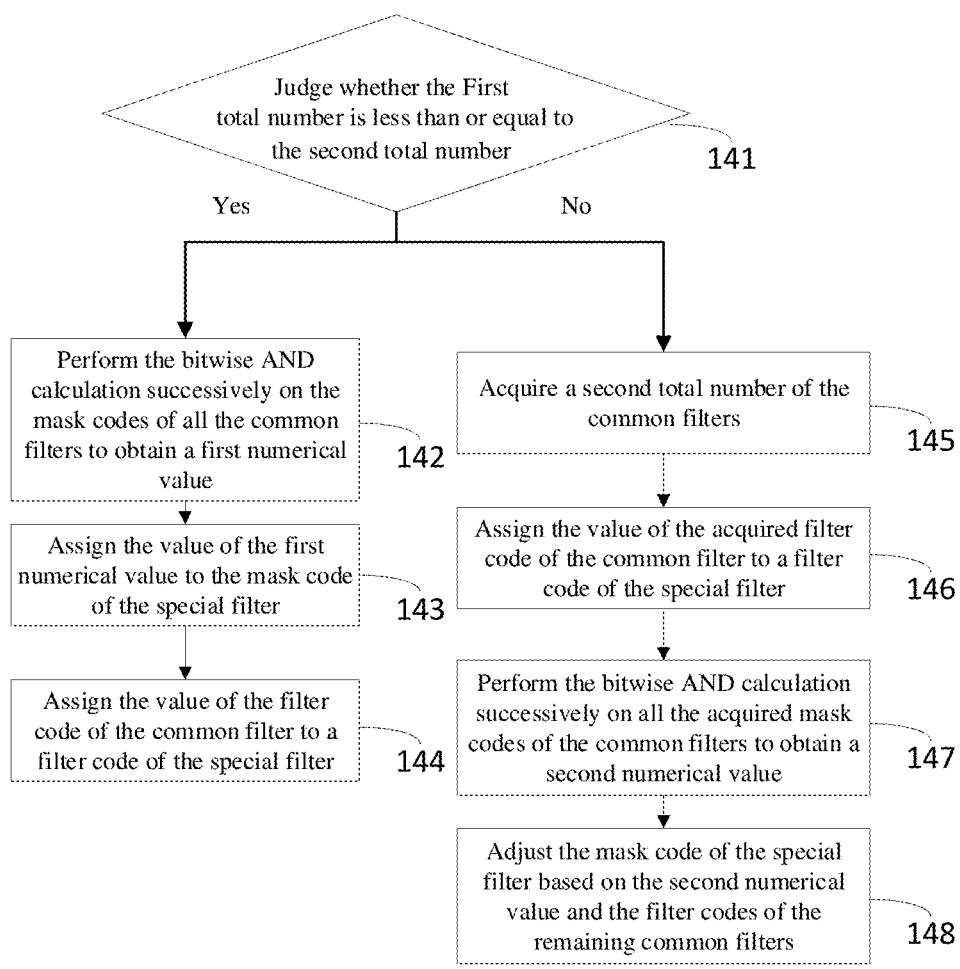
FIG. 2 is a sub-flowchart of step 140 of the method of FIG. 1.

In some embodiments, reference is made to FIG. 2, which illustrates a sub-flowchart of step 140 of the method of FIG. 1. The step 140 includes, but is not limited to, the following steps: step 141: judging whether the first total number is less than or equal to the second total number; if the first total number is less than or equal to the second total number, proceed to step 142; if the first total number is greater than the second total number, proceed to step 145; step 142: performing the bitwise AND calculation successively on the mask codes of all the common filters to obtain a first numerical value; step 143: assigning the value of the first numerical value to the mask code of the special filter; and step 144: assigning the value of the filter code of the common filter to a filter code of the special filter.

In an embodiment of the present application, when comparing the first total number with the second total number, if the number of a first total number is less than or equal to the second total number, it means that all the filter codes in the common filter can be directly assigned value to the filter in the special filter. When the first total number and the second total number are equal, the filter codes of all the common filters can just be assigned value to all the filter codes in the special filter in a one-to-one manner. When the first total number is less than the second total number, then after all the filter codes of the common filters are assigned value to the filter codes in the special filter one by one in order, the filter codes in the special filter still have the remaining filter codes which have not been assigned a value. The data bits of these remaining filter codes which have not been assigned a value are all in an initialized state, i.e. all the data bits are 1. In order to avoid that data can pass through the special filter, after all the common filters are combined, it is further necessary to assign the data of all the remaining filter codes which have not been assigned a value the value of 0.

Specifically, firstly, the bitwise AND calculation is performed successively on mask codes of all the common filters to obtain a first numerical value, then the first numerical value is assigned to the mask code of the special filter, namely, the bitwise AND calculation is performed on the mask code of the second common filter and the mask code of the first common filter, then the bitwise AND calculation is performed on the calculation result and the mask code of a third common filter, and so on. After knowing that the bitwise AND calculation is performed on mask codes of all the common filters, the calculated first numerical value is assigned to the mask value of the special filter. Then, according to the above procedure, all the filter codes of the common filter are assigned to the filter code in the special filter one by one in order. When there are filter codes of the special filter remaining, the values of the remaining filter codes are set to zero.

In some embodiments, with continued reference to FIG. 2, the step 140 may further comprise: step 145: acquiring a second total number of the common filters; step 146: assigning the value of the acquired filter code of the common filter to a filter code of the special filter; step 147: performing the bitwise AND calculation successively on all the acquired mask codes of the common filters to obtain a second numerical value; and step 148: adjusting the mask code of the special filter based on the second numerical value and the filter codes of the remaining common filters.

Further, in addition to the case of whether the first total number is less than or equal to the second total number, there may be a case where the first total number is greater than the second total number. That is, the case where the number of filter codes of all the common filters is greater than the number of all the filter codes in the special filter. In this case, when the filter codes of the common filters are assigned value to the filter codes in the special filter one by one in order, there may be a case where all the filter codes in the special filter have been assigned values, and in all the common filters, there may be remaining filter codes of the common filters which have not been assigned values.

Figure 3:
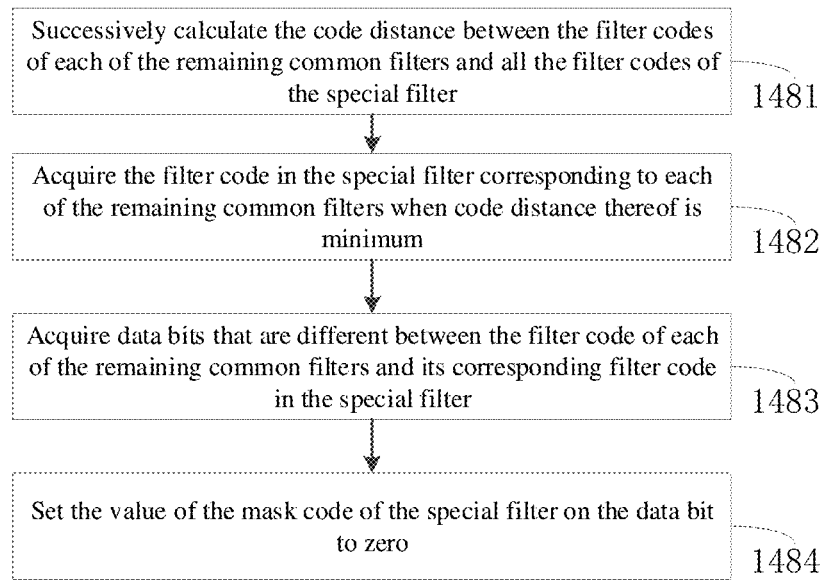
FIG. 3 is a sub-flowchart of step 148 of the method of FIG. 2.

To enable a special filter to filter out the data that can be filtered by these remaining common filters which have not been assigned values, further, reference is made to FIG. 3, which illustrates a sub-flowchart of step 148 of the method of FIG. 2. The step 148 includes, but is not limited to, the following steps: step 1481: successively calculating the code distance between the filter codes of each of the remaining common filters and all the filter codes of the special filter; step 1482: acquiring the filter code in the special filter corresponding to each of the remaining common filters when code distance thereof is minimum; step 1483: acquiring data bits that are different between the filter code of each of the remaining common filters and its corresponding filter code in the special filter; and step 1484: setting the value of the mask code of the special filter on the data bit to zero.

In an embodiment of the present application, the code distance calculation is performed on the filter codes of each of the remaining common filters that have not yet been assigned values, and all the filter codes that have been assigned values in the special filter. The code distance is the number of bits with different values on corresponding data bits. For example, when the filter code is eleven bits, values of each corresponding data bit of the eleven data bits in the filter code of the common filter and all the filter codes in the special filter are counted. For example, when the values of the first data bit and the third data bit of the filter code of the common filter are different from the values of the first data bit and the third data bit of the first filter code in the special filter, and the values on other data bits are the same, it means that the values on two data bits are different between the filter code of the common filter and the first filter code of the special filter, and at this time, the code distance between the filter code of the common filter and the first filter code of the special filter is 2. By parity of reasoning, it is possible to calculate the code distance between the filter code of any one of the remaining common filters that have not yet been assigned a value and each filter code of the special filter.

After calculating the code distance between the filter code of each of the remaining common filters and all the filter codes of the special filter, a minimum value of the code distance is acquired. When the code distance is the minimum value, it indicates that the similarity between the filter code of the common filter configured to calculate the minimum code distance and the filter code of the special filter configured to calculate the minimum code distance is the highest. At this time, data bits which are different between the filter code of the common filter configured to calculate the minimum code distance and the filter code of the special filter configured to calculate the minimum code distance are acquired, and the value of the mask code of the special filter on the data bit is set to zero which enables the special filter to realize a filtering function on the data that can be filtered by the common filter, By parity of reasoning, it is possible to calculate the code distance between each of the remaining common filters and all the filter codes of the special filter and assign a value to the data bit of the corresponding mask code, so as to realize that the special filter can also realize the filtering function on the data which can be filtered by all the common filters.

Figure 4:
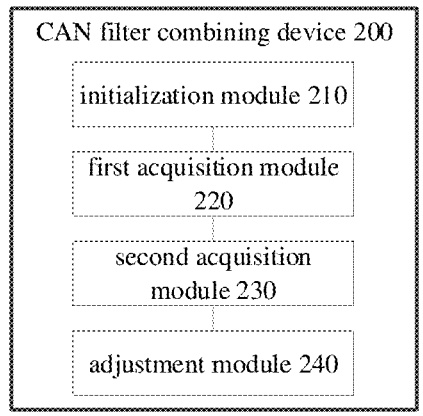
FIG. 4 is a schematic view of a structure of a CAN filter combining device provided by an embodiment of the present application.

An embodiment of the present application also provides a CAN filter combining device. Referring to FIG. 4, there is shown a schematic view of a structure of a CAN filter combining device provided by an embodiment of the present application. The CAN filter comprises a special filter and at least one common filter, the special filter comprising a mask code and at least two filter codes, and the common filter comprising a mask code and a filter code. The CAN filter combining device 200 comprises: an initialization module 210, a first acquisition module 220, a second acquisition module 230, and an adjustment module 240.

The initialization module 210 is configured to initialize the mask code and the filter codes of the special filter.

The first acquisition module 220 is configured to acquire a first total number of filter codes in the special filter and a second total number of the common filter.

The second acquisition module 230 is configured to acquire mask codes and filter codes of all the common filters.

The adjustment module 240 is configured to adjust the mask code and the filter codes of the special filter on the basis of the first total number, the second total number, and the mask codes and the filter codes of all of the common filters, such that data capable of passing through each of the common filters is enabled to pass through the special filter.

In some embodiments, the adjustment module 240 is further configured to determine whether the first total number is less than or equal to the second total number; if the the first total number is less than or equal to the second total number, the bitwise AND calculation is successively performed on mask codes of all the common filters to obtain a first numerical value; the first numerical value is assigned to the mask code of the special filter; the value of the filter code of the common filter is assigned to a filter code of the special filter.

In some embodiments, the adjustment module 240 is further configured to acquire a second total number of the common filters if the first total number is greater than the second total number; the value of the acquired filter code of the common filter is assigned to a filter code of the special filter; the bitwise AND calculation is successively performed on all the acquired mask codes of the common filter to obtain a second numerical value; the mask code of the special filter is adjusted based on the second numerical value and the filter codes of the remaining common filters.

In some embodiments, the adjustment module 240 is further configured to successively calculate a code distance between the filter codes of each of the remaining common filters and all the filter codes of the special filter; acquire the filter code in the special filter corresponding to each of the remaining common filters when the code distance thereof is the minimum; acquire data bits which are different between the filter code of each of the remaining common filters and the filter code corresponding thereto in the special filter; and set the value of the mask code of the special filter on the data bit to zero.

In some embodiments, the initialization module 210 is further configured to set the value of the mask code and the filter code of the special filter to one.

Figure 5:
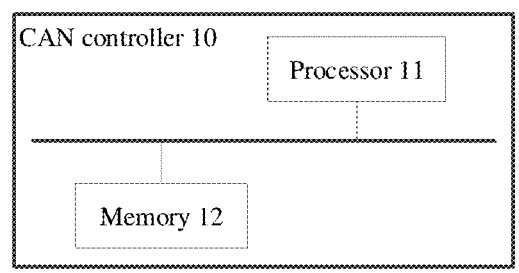
FIG. 5 is a schematic view of a hardware structure of a CAN controller that executes the above-mentioned CAN filter combining method provided by an embodiment of the present application.

An embodiment of the present application also provides a CAN controller, referring to FIG. 5, which shows a hardware structure of a CAN controller that is capable of executing the above-mentioned CAN filter combining method according to FIG. 1 to FIG. 3. The CAN controller 10 may be the CAN controller 10 shown in FIG. 1.

The CAN controller 10 includes: at least one processor 11; and a memory 12 communicatively connected to at least one processor 11. FIG. 8 takes one processor 11 thereof as an example. The memory 12 stores instructions executable by at least one processor 11, the instructions being executed by at least one processor 11 to enable at least one processor 11 to execute the CAN filter combining method according to FIG. 1 to FIG. 3. The processor 11 and the memory 12 may be connected via a bus or in other ways, the connection via a bus being exemplified in FIG. 5.

The memory 12 is a non-volatile computer-readable storage medium that can be used to store a non-volatile software program, a non-volatile computer-executable program, and a module, such as program instructions/modules corresponding to the CAN filter combining method in an embodiment of the present application, for example, the modules shown in FIG. 4. The processor 11 executes various functional applications of the server and data processing by running non-volatile software programs, instructions, and modules stored in the memory 12, i.e. realizing the CAN filter combining method in the above method embodiment.

The memory 12 can comprise a program storage area and a data storage area, wherein the program storage area can store an operating system and an application program required by at least one function; the data storage area can store data and the like created according to the use of the CAN filter combining device. In addition, memory 12 may include a high speed random access memory and may further include non-volatile memory, such as at least one magnetic disk storage device, flash memory device, or other non-volatile solid state storage device. In some embodiments, the memory 12 may optionally include a memory remotely provided with respect to the processor 11. The remote memory may be connected to the CAN filter combining device via a network. Examples of such networks include, but are not limited to, the Internet, intranets, local area networks, mobile communication networks, and combinations thereof.

The one or more modules are stored in the memory 12 and, when executed by the one or more processors 11, execute the CAN filter combining method in any of the method embodiments described above, e.g. executing the method steps from FIG. 1 to FIG. 3 described above, thereby realizing the functions of the modules and units in FIG. 4.

The above-mentioned product can execute the method provided by the embodiments of the present application, and has the corresponding functional modules and beneficial effects for executing the method. Technical details not described in detail in the embodiment can be found in the method provided in the embodiments of the present application.

An embodiment of the present application also provides a non-volatile computer-readable storage medium having stored thereon computer-executable instructions that are executed by one or more processors, for example, executing the method steps from FIG. 1 to FIG. 3 described above, thereby realizing the functions of the modules of FIG. 4.

An embodiment of the present application further provides a computer program product comprising a computer program stored on a non-volatile computer-readable storage medium. The computer program comprises program instructions which, when executed by a computer, cause the computer to execute the CAN filter combining method in any of the method embodiments described above, for example, executing the method steps from FIG. 1 to FIG. 3 described above, thereby realizing the functions of the modules of FIG. 4.

An embodiment of the present application provides a CAN filter combining method. The CAN filter comprises a special filter and at least one common filter. The special filter comprises one mask code and at least two filter codes. The common filters comprise one mask code and one filter code. The method comprises: firstly, initializing the mask code and the filter codes of the special filter, then acquiring a first total number of the filter codes in the special filter and a second total number of the common filters, acquiring mask codes and filter codes of all of the common filters, and adjusting the mask code and the filter codes of the special filter on the basis of the first total number, the second total number, and the mask codes and the filter codes of all of the common filters, such that data capable of passing through each of the common filters is enabled to pass through the special filter. The CAN filter combining method provided by the embodiments of the present application reduces the load of a processor, and prevents a CAN controller from processing a large amount of irrelevant data, thereby accelerating communications.

It should be noted that the device embodiments described above are merely schematic, wherein the units illustrated as separate parts may or may not be physically separated, and the parts shown as units may or may not be physical units, i.e. may be located in one place, or may also be distributed over multiple network units. Some or all of modules may be selected to achieve the object of the embodiments and solutions according to actual needs.

From the above description of the implementation mode, it will be clear to a person skilled in the art that the implementation modes can be implemented by means of software plus a general purpose hardware platform, and can of course also be implemented by means of hardware. It will be appreciated by those of ordinary skill in the art that the implementation of all or part of the flow of the methods of the above embodiments may be accomplished by a computer program instructing related hardware. The program can be stored on a computer-readable storage medium. The program, when executed, can include the flow of the embodiments of various methods mentioned above. The storage medium may be a magnetic disk, an optical disk, a Read-Only Memory (ROM), or a Random Access Memory (RAM), etc.

Finally, it should be noted that: the above embodiments are merely illustrative of the technical solutions of the present application, rather than limiting thereto; combinations of technical features in the above embodiments or in different embodiments are also possible within the idea of the present application, and the steps can be implemented in any order, and there are many other variations of the different aspects of the present application as described above, which are not provided in detail for the sake of brevity; although the present application has been described in detail with reference to the foregoing embodiments, those of ordinary skills in the art will appreciate that: the technical solutions disclosed in the above-mentioned embodiments can still be modified, or some of the technical features can be replaced by equivalents; such modifications and substitutions do not depart the essence of corresponding technical solutions from the scope of the technical solutions of various embodiments of the present application.

The invention claimed is:

1. A controller area network (CAN) filter combining method, wherein the CAN filter comprises a special filter and at least one common filter, the special filter comprising a mask code and at least two filter codes, and the common filter comprising a mask code and a filter code, wherein the method comprises:
  initializing the mask code and the filter codes of the special filter;
  acquiring a first total number of the filter codes in the special filter and a second total number of common filters;
  acquiring mask codes and filter codes of all of the common filters; and
  adjusting the mask code and the filter codes of the special filter on the basis of the first total number, the second total number, and the mask codes and the filter codes of all of the common filters, to enable data capable of passing through each of the common filters to pass through the special filter.

2. The method according to claim 1, wherein a step of adjusting the mask code and the filter codes of the special filter on the basis of the first total number, the second total number, and the mask codes and the filter codes of all of the common filters, specifically comprises:
  judging whether the first total number is less than or equal to the second total number;
  performing a bitwise AND calculation successively on the mask codes of all the common filters to obtain a first numerical value if the first total number is less than or equal to the second total number;

assigning a value of the first numerical value to the mask code of the special filter; and
assigning the value of the filter code of the common filter to a filter code of the special filter.

3. The method according to claim 2, further comprising:
acquiring the second total number of the common filters if the first total number is greater than the second total number;
assigning the acquired value of the filter code of the common filter to a filter code of the special filter;
performing the bitwise AND calculation successively on all acquired mask codes of the common filters to obtain a second numerical value; and
adjusting the mask code of the special filter based on the second numerical value and the filter codes of remaining common filters.

4. The method according to claim 3, wherein the step of adjusting the mask code of the special filter based on the second numerical value and the filter codes of remaining common filters specifically comprises:
successively calculating a code distance between the filter codes of each of the remaining common filters and all filter codes of the special filter;
acquiring the filter code in the special filter corresponding to each of the remaining common filters when code distance thereof is minimum;
acquiring data bits that are different between the filter code of each of the remaining common filters and its corresponding filter code in the special filter; and
setting the value of the mask code of the special filter on the data bit to zero.

5. The method according to claim 1, wherein the step of initializing the mask code and filter codes of the special filter specifically comprises:
setting the value of the mask code and filter code of the special filter to one.

6. A controller area network (CAN) filter combining device, wherein the CAN filter comprises a special filter and at least one common filter, the special filter comprising a mask code and at least two filter codes, and the common filter comprising a mask code and a filter code, wherein the device comprises:
an initialization module configured to inialize the mask code and the filter codes of the special filter;
a first acquisition module configured to acquire a first total number of filter codes in the special filter and a second total number of the common filters;
a second acquisition module configured to acquire mask codes and filter codes of all the common filters; and
an adjustment module configured to adjust the mask code and the filter codes of the special filter on the basis of the first total number, the second total number, and the mask codes and the filter codes of all of the common filters, to enable data capable of passing through each of the common filters to pass through the special filter.

7. The device according to claim 6, wherein the adjustment module is further configured for judging whether the first total number is less than or equal to the second total number; perform a bitwise AND calculation successively on mask codes of all the common filters to obtain a first numerical value if the first total number is less than or equal to the second total number, assign the first numerical value to the mask code of the special filter, and assign a value of the filter code of the common filter to a filter code of the special filter.

8. The device according to claim 7, wherein the adjustment module is further configured to acquire a second total number of the common filters if the first total number is greater than the second total number, assign the value of the acquired filter code of the common filter to a filter code of the special filter, perform the bitwise AND calculation successively on all acquired mask codes of the common filter to obtain a second numerical value, and adjust the mask code of the special filter based on the second numerical value and the filter codes of remaining common filters.

9. The device according to claim 8, wherein the adjustment module is further configured successively to calculate a code distance between the filter codes of each of the remaining common filters and all the filter codes of the special filter, acquire the filter code in the special filter corresponding to each of the remaining common filters when the code distance thereof is minimum, acquire data bits which are different between the filter code of each of the remaining common filters and the filter code corresponding thereto in the special filter, and set the value of the mask code of the special filter on the data bit to zero.

10. The device according to claim 1, wherein the initialization module is further configured to set the value of the mask code and filter code of the special filter to one.

11. A controller area network (CAN) controller, comprising:
at least one processor; and
a memory communicatively connected to the at least one processor;
wherein the memory stores instructions executable by the at least one processor, the instructions being executed by the at least one processor to enable the at least one processor to execute a CAN filter combining method, the CAN filter comprising a special filter and at least one common filter, the method comprising:
initializing a mask code and at least two filter codes of the special filter;
acquiring a first total number of the filter codes in the special filter and a second total number of common filters;
acquiring mask codes and filter codes of all common filters; and
adjusting the mask code and the filter codes of the special filter on the basis of the first total number, the second total number, and the mask codes and the filter codes of all of the common filters.

12. The CAN controller according to claim 11, wherein the mask code and the filter codes of the special filter are adjusted by means of:
judging whether the first total number is less than or equal to the second total number;
performing a bitwise AND calculation successively on the mask codes of all the common filters to obtain a first numerical value, if the first total number is less than or equal to the second total number;
assigning a value of the first numerical value to the mask code of the special filter; and
assigning the value of the filter code of the common filter to a filter code of the special filter.

13. The CAN controller according to claim 12, wherein the method further comprises:
acquiring the second total number of the common filters if the first total number is greater than the second total number;
assigning the acquired value of the filter code of the common filter to a filter code of the special filter;
performing the bitwise AND calculation successively on all acquired mask codes of the common filters to obtain a second numerical value; and adjusting the mask code of the special filter based on the second numerical value and the filter codes of remaining common filters.

14. The CAN controller according to claim 13, wherein the mask code of the special filter based on the second numerical value and the filter codes of remaining common filters are adjusted by means of:
- successively calculating a code distance between the filter codes of each of the remaining common filters and all filter codes of the special filter;
- acquiring the filter code in the special filter corresponding to each of the remaining common filters when code distance thereof is minimum;
- acquiring data bits that are different between the filter code of each of the remaining common filters and its corresponding filter code in the special filter; and
- setting the value of the mask code of the special filter on the data bit to zero.

15. The CAN controller according to claim 11, wherein the mask code and filter codes of the special filter are initialized by means of:
- setting the value of the mask code and filter code of the special filter to one.

* * * * *